UNITED STATES PATENT OFFICE.

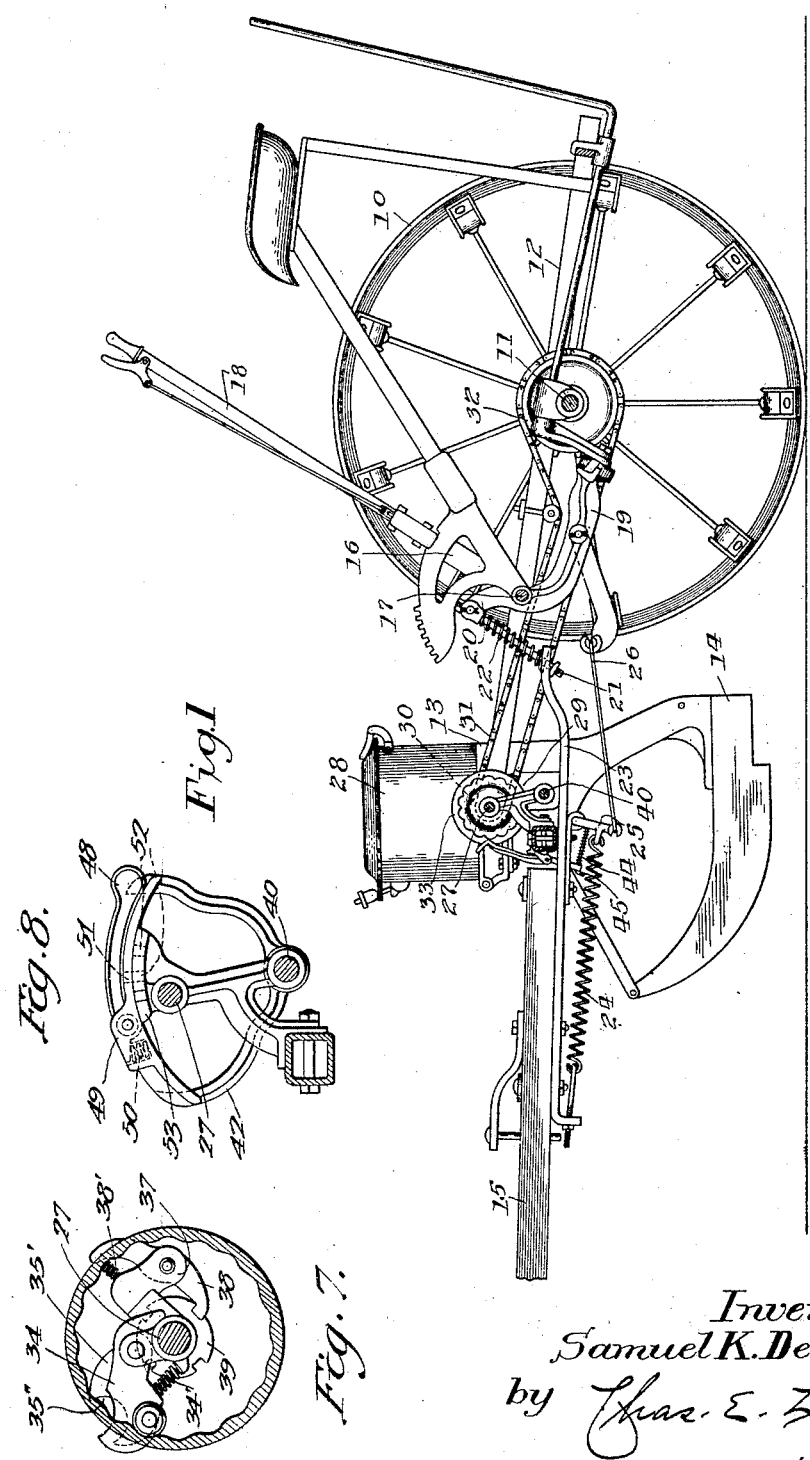

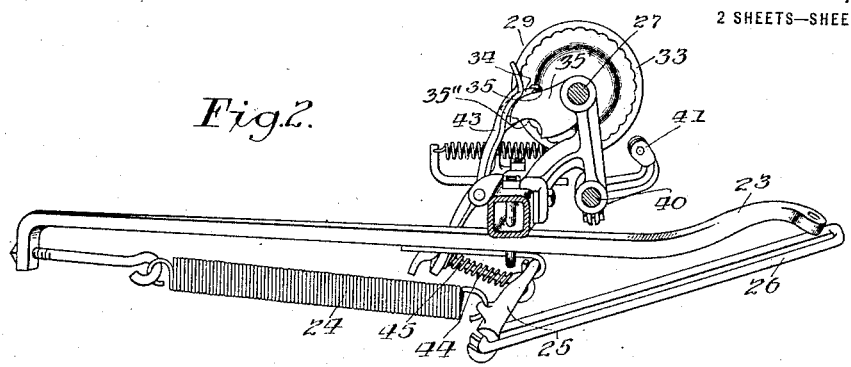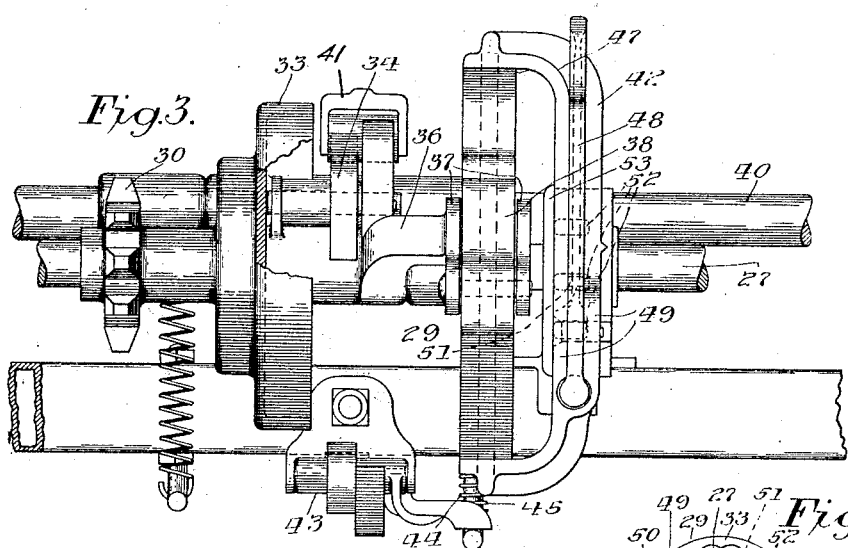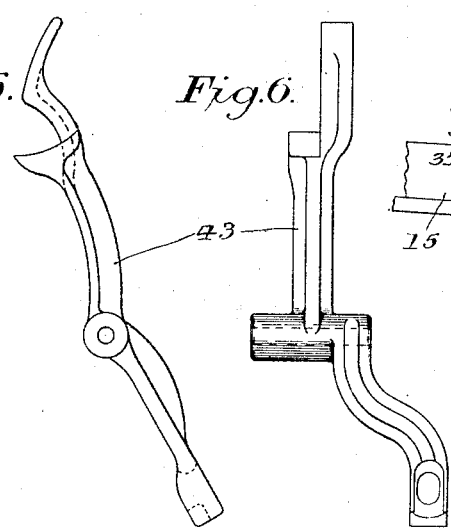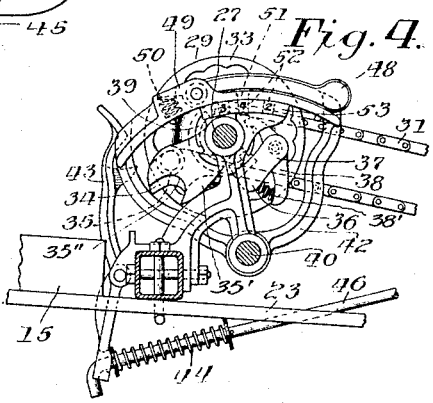

SAMUEL K. DENNIS, OF CHICAGO, ILLINOIS, ASSIGNOR, BY MESNE ASSIGNMENTS, TO INTERNATIONAL HARVESTER COMPANY, A CORPORATION OF NEW JERSEY.

CLUTCH MECHANISM FOR CORN-PLANTERS AND LIKE MACHINES.

1,327,090.                Specification of Letters Patent.         Patented Jan. 6, 1920.

Original application filed September 15, 1913, Serial No. 789,837. Divided and this application filed August 4, 1917, Serial No. 184,516. Renewed October 22, 1919. Serial No. 332,546.

*To all whom it may concern:*

Be it known that I, SAMUEL K. DENNIS, a citizen of the United States, residing at Chicago, in the county of Cook and State of Illinois, have invented certain new and useful Improvements in Clutch Mechanism for Corn-Planters and like Machines, of which the following is a full, clear, and exact specification.

My invention relates to clutch mechanism for corn planters and like machines, this application being a division of application Serial No. 789,837, filed September 15, 1913.

The object of this invention is to provide an improved and simplified construction for clutch mechanism and tripping mechanism therefor, and more specifically to provide a construction which is easily operated, is compact, and may be shipped without danger of breakage.

One form of my clutch mechanism is illustrated in the accompanying drawings, wherein similar reference characters indicate like parts throughout the several views, and in these drawings—

Figure 1 is a side elevation, partly in section, of a corn planter provided with my improved clutch mechanism;

Fig. 2 is a vertical sectional view of the clutch mechanism taken on an enlarged scale;

Fig. 3 is a top plan view of the mechanism taken on an enlarged scale;

Fig. 4 is a side elevational view showing the details of the clutch mechanism and a modified construction of the tripping mechanism;

Figs. 5 and 6 are enlarged side elevational and front elevational views of the clutch tripping lever; and Figs. 7 and 8 are detail views illustrating, respectively, the clutch mechanism and the mounting for the clutch controlling cam.

In Fig. 1 I have illustrated a corn planter provided with my improved clutch mechanism, and this planter will be described briefly. It should, however, be understood that the clutch mechanism is not limited to use with a corn planter, this machine having been illustrated merely to show one practical embodiment of the invention. The planter illustrated comprises carrying wheels 10, an axle 11, a main or supporting frame 12 carried on said axle, a runner or furrow opener frame 13 hinged to said supporting frame, furrow openers 14, a draft tongue 15 connected to both of said frames, and a frame adjusting lever 16 carried on a transverse shaft 17 fixed to the supporting frame. The frame adjusting lever is preferably in the form of a bell crank lever and comprises an upwardly extending hand portion 18, a rearwardly extending foot portion 19, and a forwardly extending lug 20. For raising the runner frame a yielding connection is provided between the forwardly extending lug 20 and the runner frame comprising a rod 21 carrying a compression spring 22 and pivoted at one end of the forwardly extending lug 20 and having its other end slidably received in a brace bar 23 fixed to the runner frame and to the tongue.

To assist the operator in moving the levers to raise the frame I provide a counterbalancing spring 24 adjustably connected at its forward end to the brace bar 23 and its rear end to a pivoted arm 25 carried on the brace bar, said arm 25 being in turn connected at its lower end to the foot portion of the lever 16 by means of a double link 26.

The seed shaft 27, operatively connected to seed plates in the seed boxes 28, is carried on the runner frame. For operating the seed shaft there is provided a clutch mechanism 29 operated by a continuously rotating sprocket wheel 30, which clutch mechanism imparts an intermittent variable movement to the seed shaft. The sprocket wheel 30 is driven in the usual manner by means of a chain 31 connected to a sprocket wheel 32 carried by the main axle of the planter.

The clutch mechanism 29 comprises an internal toothed ratchet wheel 33 operated continuously by the sprocket wheel 30, and a pivoted pawl member 34 normally actuated by spring 34' and carrying a roller 35 designed to coact with the internal teeth on the ratchet wheel and impart a variable movement to said pawl. The pawl 34 and roller 35 are pivoted on a casting 35' rotatably mounted on the seed shaft 27. The casting 35' has a recessed portion 35'' and is integrally connected with a laterally extending lug 36, which in turn is provided with spaced flanges 37, and pivotally mounted between these flanges is a pawl 38. The pawl 38 is normally actuated by a spring 38' and intermittently coacts with a ratchet or toothed disk 39 which is fixed to the seed shaft, and whenever the pawl 38 contacts with one of the notches in the ratchet 39, the seed shaft is rotated. The intermittent movement of the clutch is secured through the operation of the usual check row mechanism which, as is well-known, imparts a reciprocable movement to the check row shaft 40 carrying a knockout arm 41, which arm is held normally in position to engage the pivoted pawl 34 and move it inwardly until the arm 41 engages the recessed portion 35'' of casting 35' which is a sufficient distance to disengage the roller 35 from the ratchet teeth on the ratchet wheel 33.

As stated above, the ratchet wheel 39 is connected directly to the seed shaft, and a swinging cam member 42 is mounted to swing on shaft 40 and is provided for the purpose of engaging the pawl 38 and throwing it out of operative connection with the ratchet wheel at varying degrees in its angular movement. The cam member is rotatably adjustable on shaft 40 so that the pawl will be disengaged from the ratchet wheel at different points in the varying positions of adjustment of the cam, and therefore the seed shaft will be rotated a greater or less distance to permit two, three, four or any number of kernels to be dropped by the seed plates during one complete rotation of the clutch mechanism.

In addition to the knockout arm 41 carried by the usual checkrow shaft, supplemental means has been provided for throwing the clutch mechanism out of operation as the runner frame is raised. This means comprises a trip lever 43 pivoted to the runner frame, with its upper portion adapted to engage when at one limit of its movement the pawl member 34. The trip lever operates in a manner similar to the knockout arm to move the pawl member 34 inwardly to disengage the roller 35 from the ratchet wheel, and the lower end of the trip lever is connected yieldingly by a pressure spring 44 and a slide rod 45 to the pivoted arm 25, and when movement is imparted to the arm 25 by the lever 16, this movement will be communicated to the lever 43 and will disengage the clutch mechanism as the runner frame is raised and will release the same as the runner frame is lowered.

In Fig. 4 a slightly modified connecting means is illustrated between the frame adjusting lever and the trip lever, and comprises a link 46 slidably connected to the lower end of the lever 43 and connected at its opposite end to the rearwardly extending portion 19 of the bell crank lever 16.

With reference to the swinging cam 42 employed in connection with my clutch mechanism, it is desirable that this cam be so constructed as to not project upwardly beyond the top of the ratchet wheel 33, for the reason that in crating the mechanism for shipping purposes, when this cam extends above the ratchet wheel, it becomes liable to breakage on account of its exposed position. The handle for shifting the cam about its pivot has heretofore been mounted upon the top portion of the cam and has projected upward and thereby been subjected to the same liability of breakage. The operative portion of this cam is disposed in a plane with and surrounds the pawl 38 and ratchet 39, but the portion of the cam which controls the operation of the pawl 38 is disposed substantially below the plane of the seed shaft, and the upper portion of the cam member has been used merely for the locking mechanism which positions the cam in its various angles of adjustment. In the present construction the upper portion of the cam is offset laterally, as shown at 47, this offset portion being slightly curved longitudinally, as clearly shown in Fig. 4, the portion 47 passing to one side of the plane of the pawl member 38, preferably a short distance below the upper plane of the ratchet wheel 33.

The locking mechanism comprises a handle 48 pivoted between upstanding flanges 49 carried by the portion 47 of the cam and spring-pressed downwardly by means of the compression spring 50 which acts between the cam portion 47 and the front end of the handle 48, as illustrated in Fig. 4. The handle 48 is provided rearward of its pivot with a downwardly extending lug 51 which projects into one of a series of apertures 52 provided in a stationary plate 53 carried by the runner frame, the plate 53 being longitudinally curved in a manner similar to the cam portion 47. Each of the apertures is labeled with a numeral corresponding to the number of kernels that are planted when the cam is in position with the lug projecting into that opening.

The operation of the clutch mechanism is familiar to those skilled in the art and will therefore not be described in detail. From the above description it will be seen that I have provided a clutch mechanism and cam controlling means therefor which is simple in construction and efficient in operation. This cam controlling means has also been so constructed and designed as to enable the same to be shipped with little liability of breakage, and the adjusting mechanism for the cam has been conveniently mounted thereon in such a manner as to be easily operable.

While I have in the above specification described a specific embodiment of my invention, it is to be understood that this construction may be modified without departing from the spirit of the invention as expressed in the following claims.

What I claim as new is:

1. In a variable clutch mechanism comprising a continuously operating member, a ratchet and a rotatable pawl, a frame, a swinging cam engageable with said pawl, and means whereby said cam may be adjusted comprising a lever pivoted on said cam and engageable with said frame in a plurality of positions, the upper portion of said cam and said lever being disposed in a plane below the upper surface of said continuously operating member.

2. In a variable clutch mechanism comprising a ratchet and a rotatable pawl, a frame, a swinging cam having a lower portion engageable with said pawl and an upper portion offset from said lower portion, and means whereby said cam may be adjusted comprising a spring-pressed lever pivoted on the offset portion of said cam and engageable with said frame in a plurality of positions.

3. In a variable clutch mechanism, a shaft, a continuously operating clutch member on said shaft, a variable clutch member for connecting the continuously operating clutch member with said shaft, said variable clutch member comprising a ratchet and pawl, and a swinging cam having its lower portion surrounding said pawl to engage therewith and disengage the pawl from the ratchet at different degrees in the angular movement thereof and having its upper portion outside the path of said pawl and disposed in a plane below the upper surface of said continuously operating clutch member.

4. In a variable clutch mechanism, a shaft, a continuously operating clutch member on said shaft, a variable clutch member for connecting the continuously operating clutch member with the shaft, said variable clutch member comprising a ratchet and pawl, and a swinging cam having its lower portion adapted to engage with said pawl and having the opposite connecting portion at its top disposed in a plane below the upper surface of said continuously operating clutch.

5. In a variable clutch mechanism, a shaft, a continuously operating ratchet member journaled on said shaft, an intermittently operating pawl member operated by said ratchet member, a second pawl member connected for joint rotation with the first mentioned pawl member, a second ratchet member fixed to said shaft and adapted to be driven by said second mentioned pawl member, and a swinging cam to engage with said second mentioned pawl member to disengage it from the second ratchet member at varying degrees in the angular movement thereof, said cam surrounding the pawl at its lower portion and having its upper portion arranged in a plane below the upper surface of said first mentioned ratchet member.

In testimony whereof I affix my signature.

SAMUEL K. DENNIS.